Patented Sept. 7, 1954

2,688,604

UNITED STATES PATENT OFFICE 2,688,604

MODIFIED AMINOPLAST RESINS

Tzeng Jiueq Suen, Stamford, Conn., assignor to American Cyanamid Company, New York, N. Y., a corporation of Maine No Drawing. Application June 11, 1952,
Serial No. 292,992

8 Claims. (Cl. 260—33.2)

This invention relates to novel molding compositions comprising urea-formaldehyde resins or melamine-formaldehyde resins modified with a substituted propane having the general formula:

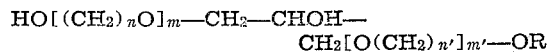

wherein R is a member selected from the group consisting of methyl and ethyl, and $n$ and $n'$ are integers between 2-6 inclusive, and $m$ and $m'$ are integers between 1-6 inclusive. This invention further relates to molding compositions of the class described in which the mold shrinkage and the after shrinkage of the molded article is appreciably diminished by the incorporation therein of the substituted propanes used in the present invention.

One of the objects of the present invention is to produce molding compositions comprising urea-formaldehyde resins or melamineformaldehyde resins modified by addition thereto of a substituted propane, such as those having the general formula:

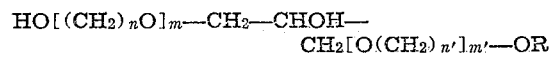

wherein R is a member selected from the group consisting of methyl and ethyl, and $n$ and $n'$ are integers between 2-6 inclusive, and $m$ and $m'$ are integers between 1-6 inclusive.

A further object of the present invention is to produce molding compositions having diminished tendency to display both mold shrinkage and after shrinkage in a molded article. A further object of the present invention is to use the reaction products as defined hereinabove as flow promoters for resinous compositions, such as urea-formaldehyde resins, melamine-formaldehyde resins and the like. These and other objects of the present invention will be discussed more completely hereinbelow.

The substituted propanes used in the composition of the present invention may be prepared in a number of different ways. (1) one may, for instance, prepare these novel substituted propanes by reacting under alkaline conditions (a) a compound having the general formula 1-halo, 2-hydroxy, 3-alkoxyalkyleneoxy-propane, wherein said alkoxy group contains between 1-2 carbon atoms inclusive and said alkyleneoxy group is derived from a diprimary straight chain aliphatic alcohol containing 1-6 alkyleneoxy groups, in which each alkyleneoxy group contains 2-6 carbon atoms, with (b) a diprimary saturated aliphatic straight chain alcohol containing 1-6 alkyleneoxy groups in which each alkyleneoxy group contains 2-6 carbon atoms. (2) A further method of preparation which may be used in producing these compounds comprises reacting (a) a compound of the general description 1,2-epoxy, 3-alkoxyalkyleneoxy-propane, wherein the alkoxy group contains 1-2 carbon atoms inclusive, and wherein said alkyleneoxy group is derived from a diprimary aliphatic straight chain alcohol containing 1-6 alkyleneoxy groups and in which each alkyleneoxy group contains 2-6 carbon atoms inclusive, with (b) a diprimary aliphatic straight chain alcohol containing 1-6 alkyleneoxy groups, in which each alkyleneoxy group contains 2-6 carbon atoms. This latter reaction can be accomplished under either acid or alkaline conditions. However, acid conditions are preferred. (3) A still further modification of the process of preparing the novel compounds of the present invention can be accomplished by reacting (a) a compound having the general formula 1-halo, 2-hydroxy, 3-hydroxyalkyleneoxy-propane, wherein the halo group may be any one of the halogens, such as chlorine, bromine, iodine, or fluorine, and wherein the alkyleneoxy group is derived from a diprimary straight chained aliphatic alcohol containing 1-6 alkyleneoxy groups in which each alkyleneoxy group contains 2-6 carbon atoms, with (b) a mono-alkyl ether of a diprimary aliphatic straight chained alcohol, wherein the alkyl group is a member of the group consisting of methyl and ethyl, and wherein the diprimary straight chained aliphatic alcohol contains between 1 and 6 alkyleneoxy groups, and in which each alkyleneoxy group contains 2-6 carbon atoms. This latter reaction must be performed under alkaline conditions. (4) A still further method of preparing the novel compounds of the present invention can be accomplished by reacting (a) a compound of the general description: 1,2-epoxy, 3-hydroxyalkyleneoxy-propane, with (b) a monoalkyl ether of a diprimary aliphatic straight chained alcohol, wherein said alkyleneoxy group is derived from a diprimary aliphatic straight chained alcohol containing 1-6 alkyleneoxy groups, in which each alkyleneoxy group contains 2-6 carbon atoms, and wherein said alkyl group is a member of the group methyl and ethyl, and wherein said diprimary straight chained aliphatic alcohol contains 1-6 alkyleneoxy groups in which each alkyleneoxy group contains 2-6 carbon atoms. This latter reaction can be acomplished under either acid or alkaline conditions. However, acid condition is preferred.

In the above general processes, the reactions under either alkaline or acid conditions, when using the epoxy compounds, do not require molar quantities of acid or alkali as the acid or alkali used does not enter into the reaction but rather acts as a catalyst. However, in the reactions with halo-substituted propanes performed under alkaline conditions, it is necessary for optimum results to use equimolar proportions of alkaline material and the halo-substituted propanes as the alkaline material does enter into the reaction and forms a salt with the halide radical which breaks off of the propane to form the epoxy linkage on the propane chain.

In the preparation of the substituted propanes used in the present invention, one may use either a diprimary aliphatic straight chained alcohol, such as in the general discussion of the alternative methods of preparing the compounds of the present invention as set forth above numbered 1 and 2, or the mono-methyl ethers or mono-ethyl ethers of the diprimary aliphatic straight chained alcohols, as set forth in the general discussion of alternative methods of preparation numbered 3 and 4. These diprimary aliphatic straight chained alcohols include ethylene glycol, diethylene glycol, triethylene glycol, tetraethylene glycol, pentaethylene glycol, hexaethylene glycol, propanediol-1,3; di(propanediol-1,3), structurally represented as H[O(CH₂)₃]₂OH; tri(propanediol-1,3), H[O(CH₂)₃]₃OH; tetra(propanediol-1,3), H[O(CH₂)₃]₄OH; penta(propanediol-1,3),

H[O(CH₂)₃]₅OH hexa(propanediol-1,3), H[O(CH₂)₃]₆OH; butanediol-1,4, or HO(CH₂)₄OH; di(butanediol-1,4) or H[O(CH₂)₄]₂OH; tri(butanediol-1,4) or

H[O(CH₂)₄]₃OH tetra(butanediol-1,4) or H[O(CH₂)₄]₄OH; penta-(butanediol-1,4) or H[O(CH₂)₄]₅OH; hexa(butanediol-1,4) or H[O(CH₂)₄]₆OH; petanediol-1,5 or HO(CH₂)₅OH; di(pentanediol-1,5) or

H[O(CH₂)₅]₂OH tri(pentanediol-1,5) or H[O(CH₂)₅]₃OH; tetra-(pentanediol-1,5) or H[O(CH₂)₅]₄OH; penta-(pentanediol-1,5) or H[O(CH₂)₅]₅OH; hexa(pentanediol-1,5) or H[O(CH₂)₅]₆OH; hexanediol-1,6 or HO(CH₂)₆OH; di(hexanediol-1,6) or H[O(CH₂)₆]₂OH; tri(hexanediol-1,6) or

H[O(CH₂)₆]₃OH tetra(hexanediol-1,6) or H[O(CH₂)₆]₄OH; penta-(hexanediol-1,6) or H[O(CH₂)₆]₅OH; and hexa-(hexanediol-1,6) or H[O(CH₂)₆]₆OH.

It has been indicated, hereinabove, (1) that the substituted propanes used in the composition of the present invention may be prepared by reacting under alkaline conditions, a compound of the general description 1-halo-2-hydroxy, 3-alkoxyalkyleneoxy-propane with a diprimary straight chained aliphatic alcohol as defined hereinabove. The former of the starting materials are substituted propanes and have been described fully as to compounds per se and as to the method of preparation in my co-pending application, Serial No. 151,032, filed March 21, 1950, now abandoned. These substituted propanes, namely the 1-halo, 2-hydroxy, 3-alkoxyalkyleneoxy-propanes may be prepared by the reaction of an epihalohydrin with a mono-methyl or mono-ethyl ether of a diprimary aliphatic straight chained alcohol. The epihalohydrins may be either epichlorohydrin, epibromohydrin, epiiodohydrin or epifluorohydrin. The compounds 1-halo, 2-hydroxy, 3-alkoxyalkyleneoxy-propane, which may be used in the preparation of the compounds of the present invention, include the following, in which the radical halo includes chloro, bromo, iodo and fluoro: 1-chloro, 2-hydroxy, 3-methoxyethoxy-propane; 1-bromo, 2-hydroxy, 3-ethoxyethoxy-propane; 1-iodo, 2-hydroxy, 3-methoxyethoxy-propane; 1-fluoro, 2-hydroxy, 3-ethoxyethoxy-propane; and their halo-substituted counterparts such as 1-halo, 2-hydroxy, 3-methoxyethoxyethoxy-propane; 1-halo, 2-hydroxy, 3-ethoxyethoxyethoxy-propane; 1-halo, 2-hydroxy, 3-methoxyethoxyethoxyethoxy-propane; 1-halo, 2-hydroxy, 3-ethoxyethoxyethoxyethoxy-propane; 1-halo, 2-hydroxy, 3-ethoxypropoxypropoxypropoxypropoxypropoxy - propane; 1 - halo, 2 - hydroxy, 3 - methoxypropoxypropoxypropoxypropoxypropoxypropoxy - propane; 1 - halo, 2 - hydroxy, 3 - ethoxypropoxypropoxypropoxypropoxypropoxypropoxy - propane; 1 - halo, 2 - hydroxy, 3 - methoxyhexoxyhexoxyhexoxyhexoxyhexoxy-propane; 1-halo, 2-hydroxy, 3-ethoxyhexoxyhexoxyhexoxyhexoxyhexoxyhexoxy - propane.

If one chooses to prepare the compounds used in the composition of the present invention by the general process set forth under (2) hereinabove, one would react a diprimary aliphatic straight chained alcohol, as defined hereinabove, with a compound having the general formula, 1,2-epoxy, 3-alkoxyalkyleneoxy-propane, and these compounds are novel compounds and are disclosed in my copending application bearing the Serial No. 151,035, filed March 21, 1950 now abandoned. Included in the group of the 1,2-epoxy, 3-alkoxyalkyleneoxy-propane are the following compounds: 1,2-epoxy, 3-methoxyethoxy-propane; 1,2-epoxy, 3-ethoxyethoxy-propane; 1,2-epoxy, 3-methoxyethoxyethoxy-propane; 1,2-epoxy, 3 - ethoxyethoxyethoxy - propane; 1,2 - epoxy, 3-ethoxypropoxypropoxypropoxypropoxypropoxypropoxy-propane; 1,2-epoxy, 3-methoxybutoxy-propane; 1,2-epoxy, 3-ethoxybutoxy-propane; 1,2-epoxy, 3-ethoxybutoxybutoxy-propane; 1,2 - epoxy, 3 - methoxyhexoxyhexoxyhexoxyhexoxyhexoxyhexoxy-propane; 1,2-epoxy, 3-ethoxyhexoxyhexoxyhexoxyhexoxyhexoxyhexoxy - propane.

If one should choose to prepare the substituted propanes used in the present invention by reacting, under alkaline conditions, the mono-methyl or the mono-ethyl ether of a diprimary aliphatic straight chained alcohol, as defined hereinabove, with a compound having the general formula 1-halo, 2-hydroxy, 3-hydroxyalkyleneoxy-propane, in accordance with the general process set forth hereinabove under the identification (3), one may select as the substituted propane as a starting material any of the following: 1-chloro, 2-hydroxy, 3-hydroxyethoxy-propane; 1-bromo, 2-hydroxy, 3-hydroxyethoxyethoxy-propane; 1-iodo, 2-hydroxy, 3-hydroxyethoxyethoxyethoxy - propane; 1 - fluoro, 2 - hydroxy, 3 - hydroxyethoxyethoxyethoxyethoxyethoxy-propane; or their halo-substituted counterparts in which the halo group may be chloro, bromo, iodo or fluoro, such as 1-halo, 2-hydroxy, 3 - hydroxyethoxyethoxyethoxyethoxyethoxyethoxy-propane; 1 - halo, 2 - hydroxy, 3 - hydroxypropoxy-propane; 1-halo, 2-hydroxy, 3-hydroxypropoxypropoxy - propane; 1 - halo, 2 - hydroxy, 3 - hydroxypentoxypentoxypentoxypentoxypentoxypentoxy-propane; 1-halo, 2-hydroxy, 3-hydroxyhexoxy-propane; and the like.

If one wishes to prepare the substituted propanes used in the composition of the present invention by the process set forth hereinabove and identified as number (4), one need only react the mono-methyl or the mono-ethyl ether of a diprimary aliphatic straight chained alcohol as defined hereinabove, with a compound having the general formula: 1,2-epoxy, 3-hydroxyalkyleneoxy-propane. Included amongst these latter compounds are the species 1,2-epoxy, 3-hydroxy-ethoxy-propane; 1,2-epoxy, 3-hydroxyethoxyethoxy-propane; 1,2-epoxy, 3-hydroxyethoxyethoxy-propane; 1,2-epoxy, 3-hydroxyethoxyethoxyethoxy-propane; 1,2-epoxy, 3-hydroxyethoxyethoxyethoxyethoxy-propane; 1,2-epoxy, 3-hydroxyethoxyethoxyethoxyethoxyethoxy-propane; 1,2-epoxy, 3-hydroxyethoxyethoxyethoxyethoxyethoxyethoxy-propane; 1,2-epoxy, 3-hydroxypropoxy-propane; 1,2-epoxy, 3-hydroxyhexoxyhexoxyhexoxyhexoxyhexoxy-propane; 1,2-epoxy, 3-hydroxyhexoxyhexoxyhexoxyhexoxy-propane.

In order to illustrate the methods of preparation of these substituted propanes generally, the following examples are set forth for the purpose of illustration only, but it must be remembered that any and all limitations contained in these examples are not to be interpreted as limitations on the case, except as indicated in the appended claims. All parts are parts by weight.

EXAMPLE 1

*Preparation of 2-hydroxy, 1-hydroxyethoxy, 3-ethoxyethoxy-propane*

548 parts of 1-chloro, 2-hydroxy-3-ethoxyethoxy-propane (3 mols) and 745 parts of ethylene glycol (12 mols) are mixed together in a suitable reaction chamber and heated to 80° C. A 50% solution, containing 120 parts of sodium hydroxide (3 mols) in water is slowly introduced with stirring in about a twenty-minute period, while the reaction temperature is maintained at 79–81° C. Thereupon, the reaction is allowed to proceed to completion in about a two-hour period at the same temperature range. Any residual alkali is neutralized with concentrated sulfuric acid. The product, with the salts filtered off, is fractionated under vacuum with a suitable fractionating column. After removing water and excess ethylene glycol, the 2-hydroxy-1-hydroxyethoxy-3-ethoxyethoxy-propane is collected at 140–144° C. under absolute pressure of 1–1.5 mm. of mercury. The total yield is about 420 parts, or about 67% of theoretical yield. Analysis found that C=51.59%; H=9.57%. Calculated for C₉H₂₀O₄, C=51.94%; H=9.62%.

EXAMPLE 2

439 parts of 1,2-epoxy, 3-ethoxyethoxy-propane (3 mols), and 558 parts of ethylene glycol (9 mols) are mixed together in a suitable reaction chamber. 15 parts of concentrated sulfuric acid is very slowly added with vigorous stirring and cooling. The mixture is then heated up to, and maintained at, 90–100° C. for about an eight-hour period. The acid is then neutralized with barium carbonate and the mixture is then filtered. The filtrate is fractionated under vacuum with a suitable column. After removing the excess of ethylene glycol, the glyceryl-α-hydroxyethyl-α'-ethoxyethylether, or 2-hydroxy, 1-hydroxyethoxy, 3-ethoxyethoxy-propane, is collected at 140–144° C., under an absolute pressure of 1–1.5 mm. of mercury.

In Examples 1 and 2 it is desirable to use an excess of a diprimary aliphatic straight chained alcohol in order to complete the reaction. In general, the use of 2–4 mols of the diprimary aliphatic straight chained alcohol per mol of the halo or epoxy compound is desired for practical purposes. The temperature of the reaction is not particularly critical; for instance, temperatures between 70–100° C. would be a desirable range.

The products used in the present invention are essentially unsymmetrical glycerol di-ethers. In the above two processes, namely, in Examples 1 and 2, the end with the hydroxy group is first linked up before the end with the alkoxy group is fitted into the structure. Obviously, the sequence could be reversed. The following two examples are set forth for the purpose of illustrating this point.

EXAMPLE 3

309 parts of 1-chloro, 2-hydroxy, 3-(β-hydroxyethoxy)-propane (2 mols), and 540 parts of ethylene glycol mono-ethyl ether (6 mols) are mixed together in a suitable reaction chamber and heated to 75–85° C. A 50% solution containing 80 parts of sodium hydroxide (2 mols) in water is slowly introduced with stirring in about a 30-minute period. Thereupon, the reaction is allowed to proceed to completion in about a 2 hour period at 75–85° C. Any residual alkali may then be neutralized with concentrated sulfuric acid. The reaction product, with the salt filtered off, is fractionated under vacuum with a suitable fractionating column. After the water and excess ethylene glycol mono-ethyl ether have been removed, the glyceryl-α-hydroxyethyl-γ-ethoxyethyl ether (2-hydroxy, 1-hydroxyethoxy, 3-ethoxyethoxy-propane) is collected at 140–144° C., under an absolute pressure of 1–1.5 mm. of mercury.

EXAMPLE 4

236 parts of 1,2-epoxy, 3-hydroxyethoxy-propane (2 mols), and 540 parts of ethylene glycol mono-ethyl ether (6 mols) are mixed together in a suitable reaction chamber. 12 parts of concentrated sulfuric acid is added very slowly with vigorous stirring and cooling. The mixture is then heated up to, and maintained at, about 80–100° C. for about a ten-hour period. The acid is then neutralized with barium carbonate, and the salt thus formed is filtered off. The filtrate is then fractionated under vacuum with a suitable fractionating column. After the excess ethylene glycol mono-ethyl ether has been removed with the water, the 1-hydroxyethoxy, 2-hydroxy, 3-ethoxyethoxy-propane is collected at 140–144° C. under an absolute pressure of 1–1.5 mm. of mercury.

The compounds used in the present invention include the following: 1-hydroxyethoxy, 2-hydroxy, 3 - methoxyethoxy - propane; 1-hydroxyethoxy, 2-hydroxy, 3-ethoxyethoxy-propane; 1-hydroxyethoxy, 2 - hydroxy, 3 - methoxyethoxyethoxy-propane; 1-hydroxyethoxy, 2-hydroxy, 3-methoxyethoxyethoxy - propane; 1 - hydroxyethoxy, 2-hydroxy, 3-ethoxyethoxyethoxy-propane; 1-hydroxyethoxy, 2-hydroxy, 3-methoxyethoxyethoxy-propane; 1-hydroxyethoxy, 2-hydroxy, 3 - methoxypentoxypentoxypentoxy - propane; 1-hydroxyethoxy, 2-hydroxy, 3-ethoxypentoxypentoxypentoxy-propane; 1-hydroxyethoxy, 2-hydroxy, 3-methoxypentoxypentoxypentoxypentoxypentoxy - propane; 1 - hydroxyethoxy, 2 - hydroxy, 3-ethoxypentoxypentoxypentoxypentoxypentoxypentoxy-propane; 1-hydroxyethoxy, 2-hydroxy, 3-methoxypentoxypentoxypentoxypentoxypentoxy - propane; 1-hydroxyhexoxyhexoxyhexoxyhexoxyhexoxyhexoxy, 2-hydroxy, 3-methoxyhexoxyhexoxyhexoxyhexoxyhexoxy-propane.

I have discovered that when I use these modifiers for synthetic resinous molding compositions, such as the urea-formaldehyde or melamine-formaldehyde molding powders, particularly do I experience the reduction in the amount of shrinkage of the articles molded with these molding powders. The following example is set forth to illustrate how this may be accomplished.

EXAMPLE 5

A urea-formaldehyde resin syrup is prepared in the conventional way with a mol ratio of formaldehyde to urea of 1.33:1, in which the reaction between the formaldehyde and urea is carried out at a pH of about 9–9.5 and at a temperature of about 25° C. until the free formaldehyde content drops to about 5%. 2-hydroxy, 1 - hydroxyethoxy, 3 - ethoxyethoxy - propane is added as a modifier. The modified resin syrup is then mixed with alpha-cellulose pulp and the mixture is dried and then ground with a suitable curing agent and lubricant to a fine powder. The proportion of resin solids:modifier:alpha-cellulose pulp is 62:5:33. In the evaluation of the molding powders prepared as described above, a molded article shows its mold shrinkage to be 4.0 mils per inch and its after shrinkage 3.9 mils per inch. An unmodified molding powder prepared in the same manner with the resin solids to alpha-cellulose ratio of 67:33 shows a mold shrinkage of 5.5 mils per inch and an after shrinkage of 8.6 mils per inch.

The determination of the shrinkage of a molded article is accomplished in the following manner. The shrinkage of the molded article is evaluated by means of a test piece in the form of a circular disc ⅛" thick and 4" in diameter and is measured in terms of "mold shrinkage" and "after shrinkage." If the diameter of the cold mold cavity is denoted as A; the diameter of the molded disc after being conditioned at 25° C. and at a relative humidity of 50% for 48 hours is denoted as B; and the diameter of the disc after further conditioning for 48 hours at 220° F. and thereafter being cooled to 25° C. at a relative humidity of 50% is denoted as C; the following equations can be set up, in which the shrinkages are measured in terms of mils/inch.

$$\text{Mold shrinkage} = \frac{A-B}{A} \times 1000$$

$$\text{After shrinkage} = \frac{B-C}{A} \times 1000$$

$$\text{Total shrinkage} = \frac{A-C}{A} \times 1000$$

These modifiers can be used with urea-formaldehyde molding powders having mol ratios different from the 1:1.33 ratio set forth hereinabove, such as mol ratios of 1:1–1:3; urea to formaldehyde, respectively. These modifiers can be used additionally to modify melamine-formaldehyde resins having mol ratios of melamine to formaldehyde within the range of 1:1 to 1:6, respectively, but preferably within the range of 1:1.5 to 1:3, respectively.

The substituted propanes of the present invention may be incorporated into the resinous material in amounts varying between about 2% and 15% by weight, based on the total weight of resin and modifier. Preferably, one could use between about 5% and 10% by weight, based on the total weight of the resin and the modifier.

This application is a continuation-in-part of my earlier application, having the Serial No. 151,033, filed March 21, 1950, now abandoned.

I claim:

1. A molding composition comprising an aminoplast resin selected from the group consisting of a melamine-formaldehyde resin and a urea-formaldehyde resin and between about 2% and 15% by weight of a substituted propane having the general formula:

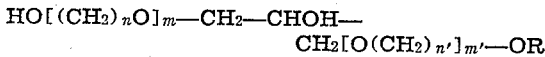

wherein R is a member selected from the group consisting of methyl and ethyl and $n$ and $n'$ are integers between 2 and 6 inclusive, and wherein $m$ and $m'$ are integers between 1–6 inclusive.

2. A molding composition comprising a urea-formaldehyde resin and between about 2% and 15% by weight of a substituted propane wherein said alkylene group contains between 2 and 6 carbon atoms having the general formula:

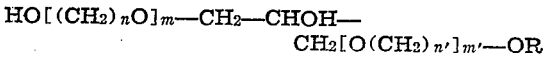

wherein R is a member selected from the group consisting of methyl and ethyl and $n$ and $n'$ are integers between 2 and 6 inclusive, and wherein $m$ and $m'$ are integers between 1–6 inclusive.

3. A molding composition comprising a urea-formaldehyde resin and between about 2% and 15% by weight of 2-hydroxy, 1-hydroxyalkyleneoxy, 3-methoxyethoxy-propane wherein said alkylene group contains between 2 and 6 carbon atoms.

4. A molding composition comprising a urea-formaldehyde resin and between about 2% and 15% by weight of 2-hydroxy, 1-hydroxalkyleneoxy, 3-ethoxyethoxy-propane wherein said alkylene group contains between 2 and 6 carbon atoms.

5. A molding composition comprising a urea-formaldehyde resin and between about 2% and 15% by weight of 2-hydroxy, 1-hydroxyalkyleneoxy, 3-ethoxyethoxyethoxy-propane wherein said alkylene group contains between 2 and 6 carbon atoms.

6. A molding composition comprising a urea-formaldehyde resin and between about 2% and 15% by weight of 2-hydroxy, 1-hydroxyethoxy, 3-methoxyethoxy-propane.

7. A molding composition comprising a urea-formaldehyde resin and between about 2% and 15% by weight of 2-hydroxy, 1-hydroxethoxyethoxy, 3-ethoxyethoxy-propane.

8. A molding composition comprising a urea-formaldehyde resin and between about 2% and 15% by weight of 2-hydroxy, 1-hydroxyethoxyethoxy, 3-ethoxyethoxyethoxy-propane.

No references cited.